Jan. 15, 1924. 1,480,873
F. WAGNER
VALVE
Filed April 21, 1921 8 Sheets-Sheet 1

Inventor:
Fritz Wagner

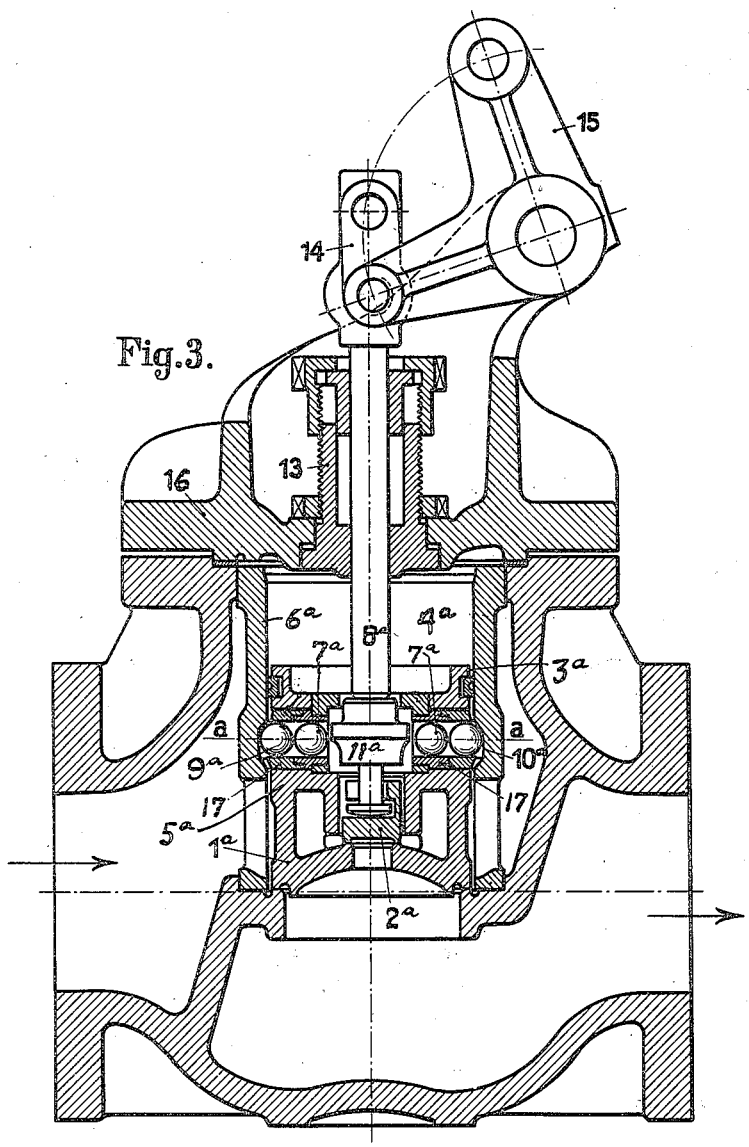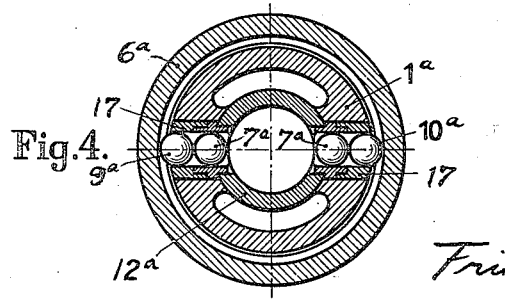

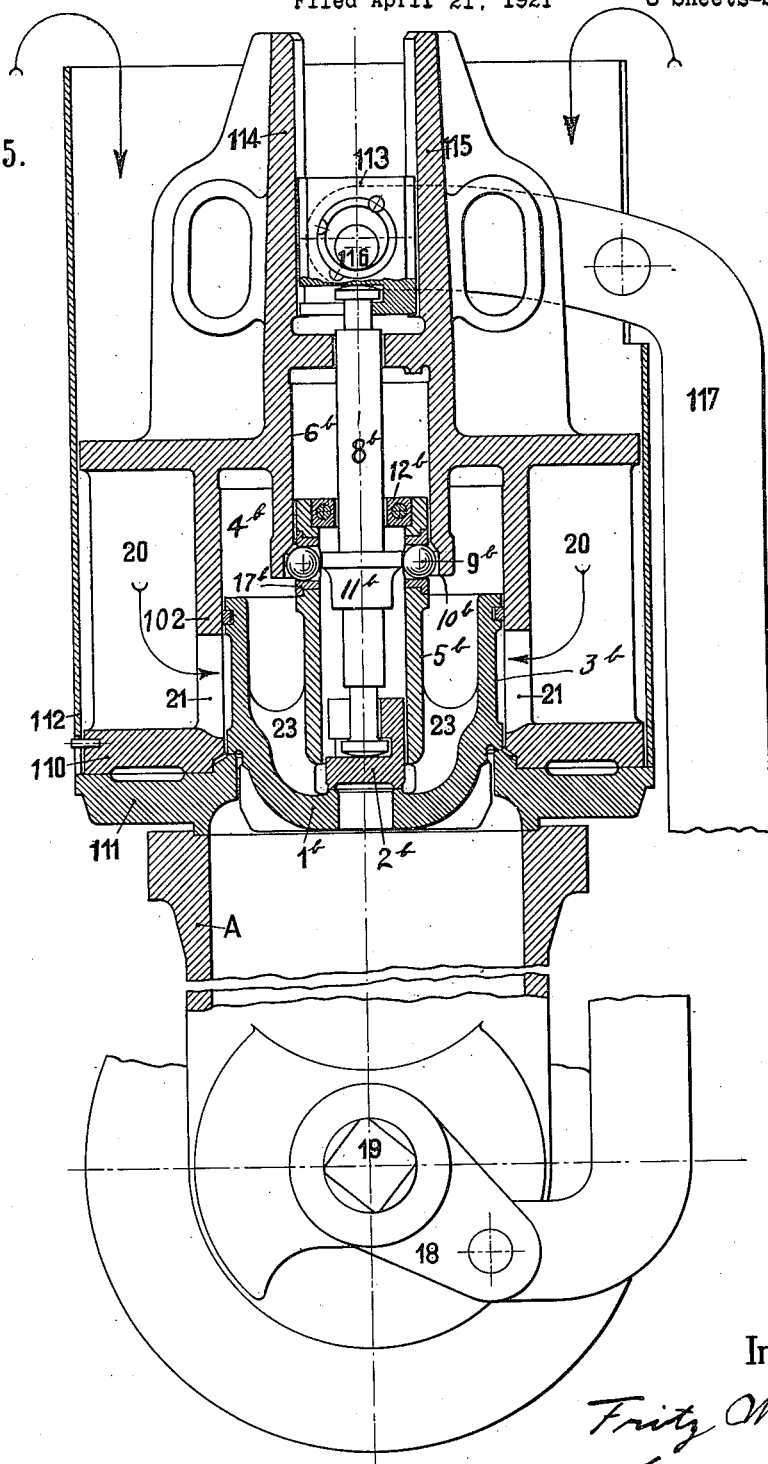

Jan. 15, 1924.

F. WAGNER

VALVE

Filed April 21, 1921

Inventor:
Fritz Wagner
by
E. W. Fairbank

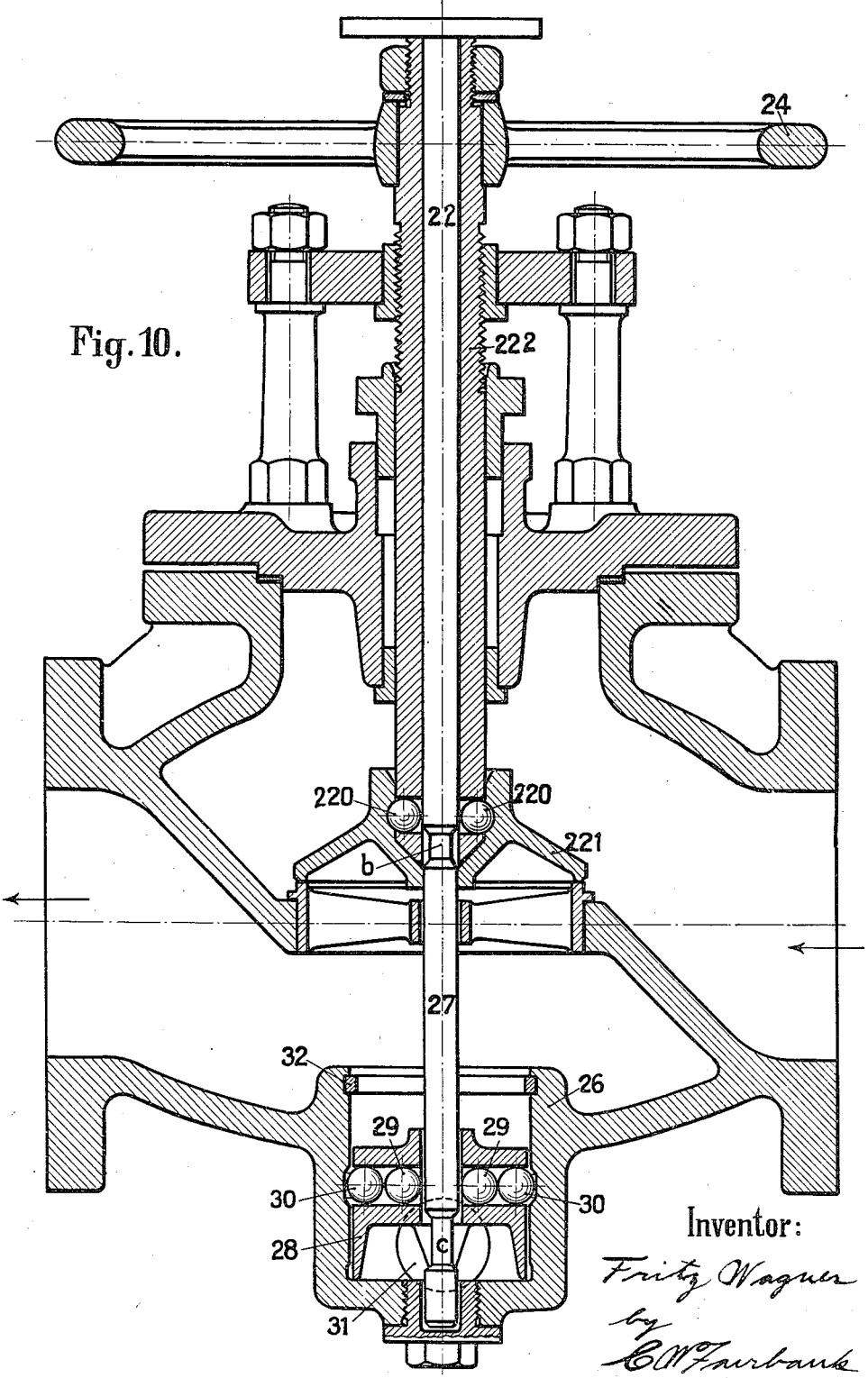

Jan. 15, 1924. 1,480,873
F. WAGNER
VALVE
Filed April 21, 1921    8 Sheets-Sheet 8
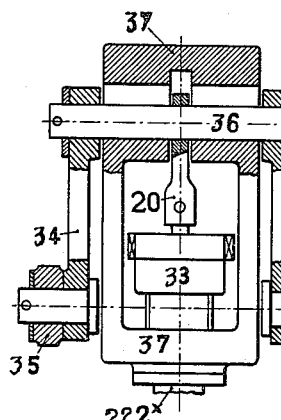
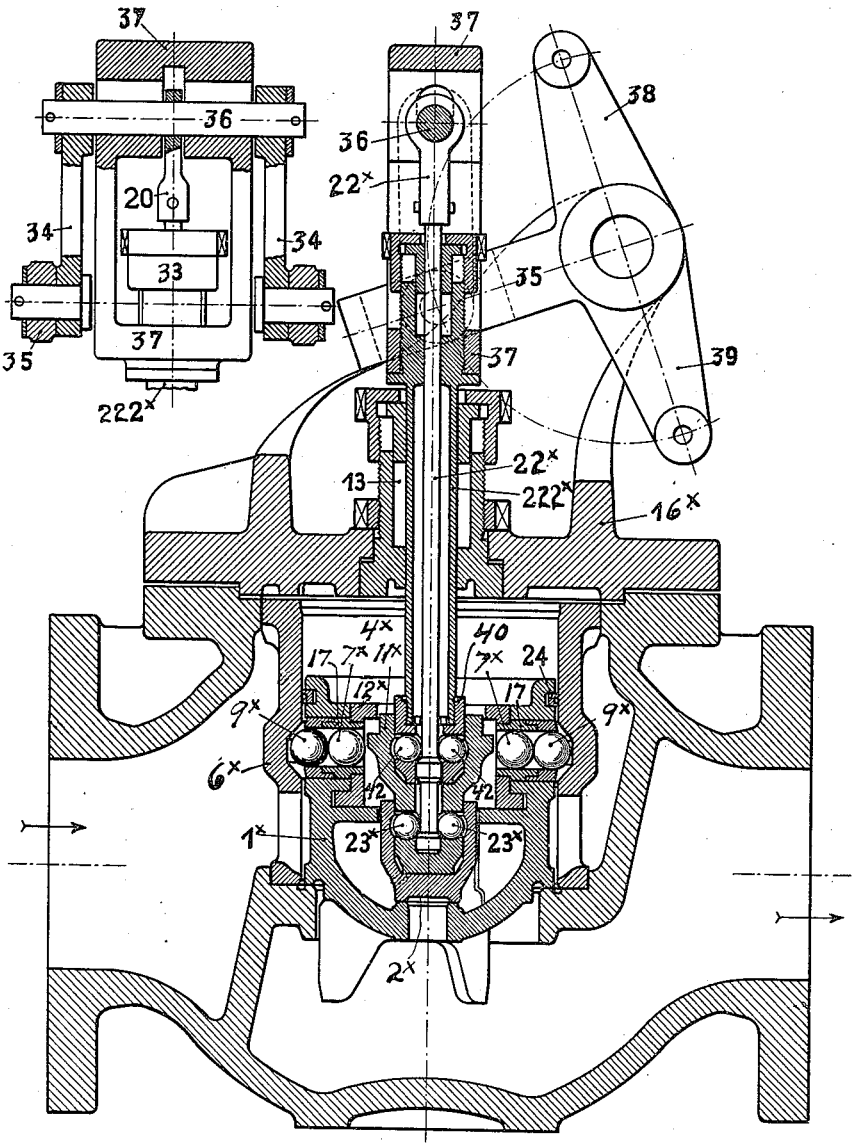
Inventor:
Fritz Wagner Patented Jan. 15, 1924.

1,480,873

UNITED STATES PATENT OFFICE.

FRITZ WAGNER, OF BERLIN-LICHTERFELDE, GERMANY.

VALVE.

Application filed April 21, 1921. Serial No. 463,343.

*To all whom it may concern:*

Be it known that I, FRITZ WAGNER, a citizen of the Republic of Germany, and a resident of Berlin-Lichterfelde, Germany, have invented certain new and useful Improvements in Valves, of which the following is a specification.

My invention is a novel connection between a valve member and its stem or spindle and is particularly adapted for use with reciprocating valves for controlling fluids under pressure. As the important feature of my invention there is provided means for quickly and easily connecting the valve stem or spindle and the valve member when in one position, or under one condition of use, and to permit of a relative longitudinal movement of the parts in another position or condition of use. The connecting means may be similar in construction or operate on the same principle in various different embodiments, although the definite or specific object to be gained may vary according to the type of valve, the use to which it is to be put and the objections or difficulties to be overcome.

Valves of large size for controlling fluid under pressure cannot be directly opened against the high pressure, and in many constructions it is customary to provide an auxiliary valve for more nearly equalizing the pressure on opposite sides of the valve before the opening movement of the main valve begins. If the auxiliary valve is arranged within the main valve member, it is common to so arrange the parts that the upper edge of the auxiliary valve engages with an abutment on the main valve as soon as the auxiliary valve has been opened, whereby further movement of the valve stem connected to the auxiliary valve causes the main valve to follow after this pre-determined lost motion between the main valve and auxiliary valve has been taken up. When the main valve is open there is thus lost motion between it and the main valve stem and a relative movement of the two causes a relative movement of the auxiliary valve in respect to its seat. In practice it often happens that a very objectionable chattering of the main valve is set up, due to the action of varying fluid pressure which may lift the valve thereby closing the auxiliary valve, followed by a change in pressure permitting the main valve to drop by gravity to an open position of the auxiliary valve. By means of my improved construction I permit the desired lost motion and preliminary opening of the auxiliary valve, but prevent such lost motion when the main valve is in open position.

In another type of valve, for instance, a boiler valve, the opening and closing is often effected by the turning of a screw spindle or by means of gearing, and a great deal of time is required to move the heavy valve to open or closed position. By means of my invention I may normally maintain the valve and valve stem rigid so far as relative longitudinal movement is concerned, but permit of the releasing of the valve from its valve stem, either manually or automatically, and an instantaneous closing of the main valve in case of emergency. After the closing of the main valve in this way, the valve stem may later be brought to the desired normal relationship to the valve and the connection to the latter re-established in a very simple and easy manner. It will thus be apparent that the conditions under which the relative longitudinal movement between the valve stem and valve is permitted or prevented may vary widely.

In carrying out my invention I provide coupling members which are movable preferably in a radial direction in respect to the valve and valve stem and project from either one end or the other of the passages or recesses in which they are mounted. In connection with them there is provided a cam member for forcing the coupling members radially and effecting the locking together of the valve and valve stem. In a different relative position of the coupling members and the cam member, the coupling members may move radially in the opposite direction, releasing the valve. Whether the cam member be stationary or movable, and whether the coupling members be carried in the valve or valve stem depends on the type of construction to which the invention is applied and the conditions and circumstances under which it is desired to effect the locking or unlocking of the valve and valve stem.

As coupling members I preferably employ balls which may be in a single annular row, or in radially disposed rows, each radial row serving as a single coupling member. It will of course be evident that other forms of radially movable elements might be provided and adapted for effecting a locking action at one end and engagement with a cam surface at the opposite end.

In the accompanying drawings I have illustrated certain embodiments of my invention:

Fig. 3 is a longitudinal section through another form of valve in its closed position;

Fig. 4 is a horizontal section on the line $a$—$a$ of Fig. 3;

Fig. 5 is a longitudinal section through a further form incorporated in a regulator arranged in the dome of the locomotive, the valve being in its closed position;

Fig. 10 shows the same valve in closed position;

Fig. 11 is a longitudinal section through a valve combining features of the forms shown in Figures 3 and 7, and Fig. 12 is a detail of the operating mechanism of the valve shown in Fig. 11.

Figure 1:
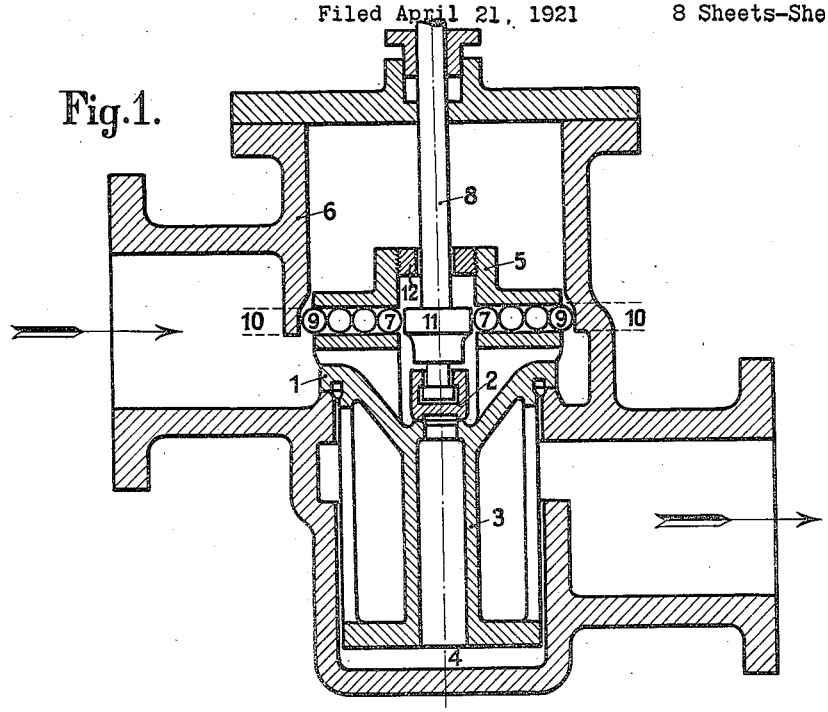
Fig. 1 is a longitudinal section through one form showing a valve in closed position.
Figure 2:
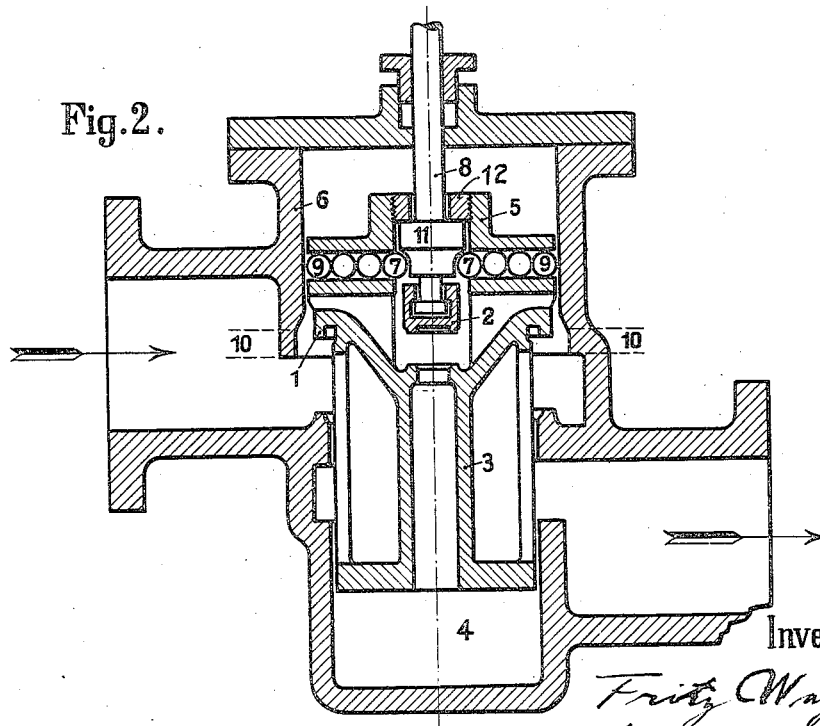
Fig. 2 is a similar view showing the valve in open position.

In the valve construction illustrated in Figs. 1 and 2, the main valve 1 has a passage therethrough controlled by an auxiliary valve 2. The main valve has a pressure piston 3 mounted in a cylinder or pressure chamber 4 communicating through the piston and past the auxiliary valve to the high pressure side of the system, so that upon the opening of the auxiliary valve the high pressure is delivered to the underside of the piston. The main valve 1 also has an upper portion 5 within which are mounted the coupling members. This valve portion 5 is slidably mounted in the casing 6, a portion of which serves as the cam member for effecting the movement of the coupling members. The coupling members are shown as a plurality of balls 7, arranged in rows in the valve portion 5, and in such a manner as to engage with one another in a radial direction in respect to the valve. A sector shaped intermediate piece may be provided so as to insure the direct radial movement of the balls and permitting the use of the same number and sizes of balls in the outer end of the rows as in the inner end. The inner balls 7 encircle and are adapted to engage with the valve stem or spindle and the outer balls 9, that is, the ones at the outer end of the radial rows, are mounted for engagement with the valve casing 6.

The valve stem and the casing are so designed as to present cam or locking surfaces and effect the desired radial movement of the balls constituting the coupling members. The portion of the valve casing 6 which is opposite to the coupling members when the main valve is in closed position is of slightly larger diameter or is formed with a groove permitting the outward limited movement of the coupling members. The surface of this portion 10 is connected to the main cylindrical surface of the valve casing 6 by a cam portion, so that as the valve moves upwardly the engagement of the coupling members with this cam surface forces the coupling members inward radially. The stem 8 has a cylindrical portion or annular flange 11 of such diameter as to engage with the inner balls 7 or the inner ends of the coupling members to force the coupling members into engagement with the surface 10 when the valve is closed, as is shown in Fig. 1. Below this portion 11 there is a portion of reduced diameter connected to the larger portion by a cam or inclined surface. The difference in diameter between the larger and smaller portions of the cam surface on the valve stem is substantially equal to the difference in diameter between the surface 10 and the main cylindrical surface of the valve casing 6.

The portion 11 on the valve stem or spindle presents a shoulder at its upper end which is movable toward and from and may engage with an abutment or shoulder 12 on the main valve. This relative movement of the spindle in respect to the main valve is only sufficient to permit the larger part 11 on the valve stem to come above the coupling members. It is thought that the operation of this form will be sufficiently clear from an inspection of Figs. 1 and 2, but briefly it is as follows:

Upon lifting the valve stem 8 the auxiliary valve is opened to permit pressure to pass to the cylinder 4 beneath the piston 3, and at the same time to bring the portion 11 of the stem above the coupling members. The further movement of the valve stem results in the engagement of the portion 11 with the abutment 12, and a lifting of the main valve. This causes an inward radial movement of the coupling members as they travel over the cam surface from the part 10 of the valve casing, and the coupling members thus lock beneath the portion 11 of the valve stem and hold it firmly against the abutment 12, so that further lost motion between the main valve and the valve stem is prevented. The main valve may be opened to any desired extent and the coupling of the members will remain secure, due to the cylindrical character of the surface of the main casing 6. Any chattering or pounding of the main valve in respect to the auxiliary valve is prevented. The parts remain locked until the main valve is moved substantially to closed position, where the coupling members may again move outward radially and the valve stem may move down to a further distance to close the auxiliary valve.

In the construction illustrated in Figs. 3 and 4, the same general principle is employed and the same general object secured, but the details of construction are different. The valve casing portion 6ª is formed as a separate cage within the main casing and cooperates with the upper surface of the main valve to form the pressure chamber 4ª. The fluid under high pressure may enter the chamber 4ª only through the comparatively narrow space or free play permitted between the piston portion 3ª of the main valve and the inside wall of the casing part 6ª. The cover 16 of the main casing and through which the valve stem or spindle 8ª extends, is provided with a stuffing box 13. The outer end of the valve spindle is shown as connected with a lever 15 mounted on the casing cover 16 and connected to the spindle by links 14. In this form I have illustrated a construction and arrangement of coupling members which may be incorporated in the form shown in Figs. 1 and 2. The coupling members or balls are arranged in two radially extending and diametrically opposite rows and are mounted in separate guides or ball cages 17 which may be made of hardened material to better withstand wear, and are so designed that they may be removed and replaced when worn out. It will be noted that the reinforced or hardened guides or cages for the coupling members are more important in this form than in Figs. 1 and 2, as the fluid pressure tends to force the coupling members inwardly when the main valve has been closed, but before the auxiliary valve is closed. The auxiliary valve can only be closed by the pressure applied to it to force the coupling members outwardly to their locked position. Thus there is more resistance to the movement of these coupling members and liability of greater wear than in the form shown in Figs. 1 and 2.

The operation of the construction shown in Figs. 3 and 4 is as follows: As the valve stem 8ª is lifted the auxiliary valve 2ª leaves its seat and permits the escape of the high pressure fluid from the chamber 4ª. The further movement of the valve stem brings the stem portion 11ª into engagement with the abutment 12ª, liberates the coupling members 7ª and 9ª, and permits them to move inward radially and the main valve to lift from its seat. As the coupling members leave the part 10ª of the valve casing 6ª they move inwardly to lock the stem and main valve together and prevent any relative longitudinal movement of the stem and main valve when the latter is off its seat.

Figure 6:
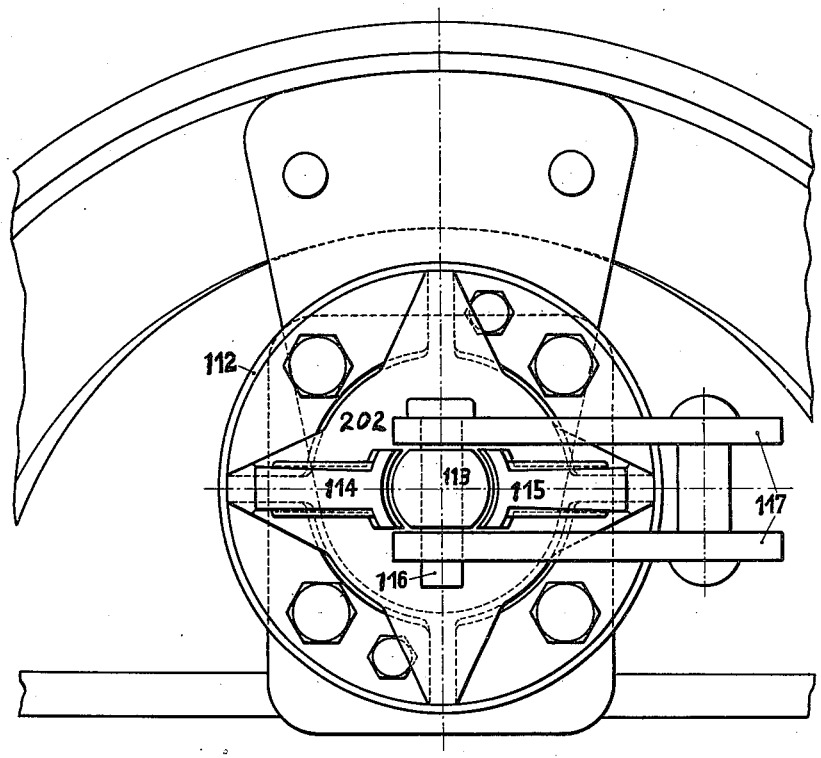
Fig. 6 is a top plan of the form shown in Fig. 5.

In Figs. 5 and 6 I have illustrated a construction particularly designed for use as a regulator inside of the dome of a locomotive and in this construction I have so designed and arranged the parts that the balls or other coupling devices between the spindle and the main valve are not subjected to any steam pressure tending to move them one way or the other. The casing is shown as including two concentric annular wall portions 102 and 6ᵇ. These may be formed integral with the main body of the valve casing and the casing may be connected at its open lower end to the inlet pipe A of the locomotive. As shown, I form the valve seat on a separate member 111 which is held in place between the lower end wall 110 of the casing, and said inlet pipe. This valve seat member 111 may be thus readily removed and replaced by a new one in case of wear or defective action. The casing wall 102 is provided with ports 21 for the passage of the steam and arranged between vertical ribs 20. The main casing may be enclosed in a sheet metal jacket 112 which extends upwardly toward the top of the dome as to direct the dry steam to the inlet pipe A when the main valve is open.

The casing wall 102 serves as a cylinder for a piston part 3ᵇ on the main valve 1ᵇ and the defined space forms a pressure chamber 4ᵇ corresponding to the pressure chamber 4ª of Fig. 3. The casing wall 6ᵇ has a cam groove or enlargement 10ᵇ at its lower end for receiving the coupling members when the main valve is closed.

The main valve has a cylindrical wall 5ᵇ spaced from and concentric with the outer piston wall 3ᵇ and arranged to telescope within the wall 6ᵇ. This wall 5ᵇ is connected to the main valve by means of ribs 23 and has ball guides 17ᵇ for carrying the balls 9ᵇ, serving as coupling members. The auxiliary valve and the valve stem may be substantially as illustrated in Fig. 3. As shown, the auxiliary valve 2ᵇ is connected to the valve stem 8ᵇ and the latter has an enlargement 11ᵇ presenting a downwardly and inwardly inclined cam surface. The upper end of the wall 5ᵇ has an abutment 12ᵇ with which the part 11ᵇ may engage when the auxiliary valve is open.

For opening the regulator there is provided a shaft 19 with a crank arm 18 connected to a link 117. The upper end of this is connected to a cross-head 113 by means of a bolt 116, and the cross-head is connected to the upper end of the valve stem 8ᵇ. The cross-head is guided in flanges 114 and 115 which may be formed integral with the body of the valve casing.

As the shaft 19 is rotated, the cross-head 113 is lifted and the auxiliary valve is opened. The further movement of the valve stem causes it to engage the abutment 12ᵇ and open the main valve and at the same time the balls 9ᵇ move inwardly to lock the valve stem to the main valve. As the space encircled by the ball carrying wall 5ᵇ is in open communication at its lower end with the space between the walls 3ᵇ and 5ᵇ, it will be noted that there is no pressure difference at opposite ends of the ball guides and the balls are easily moved into or out of position to lock the valve stem to the main valve or to permit the desired relative movement.

In the construction above described the coupling members are carried by the main valve member and are movable into or out of locking engagement with the valve stem or spindle. This is not an essential, as the coupling members may be carried by the valve stem and move into and out of locking engagement with the valve. I have illustrated such a construction in Figs. 7 to 10 inclusive. When mounted in the valve stem they may serve for permitting a rapid closing of the valve independently of any movement of the valve stem, but the releasing of the coupling members is effected in the same general manner as in the other forms, namely by a relative axial movement of the ball carrier and a cam member.

Figures 7, 8:
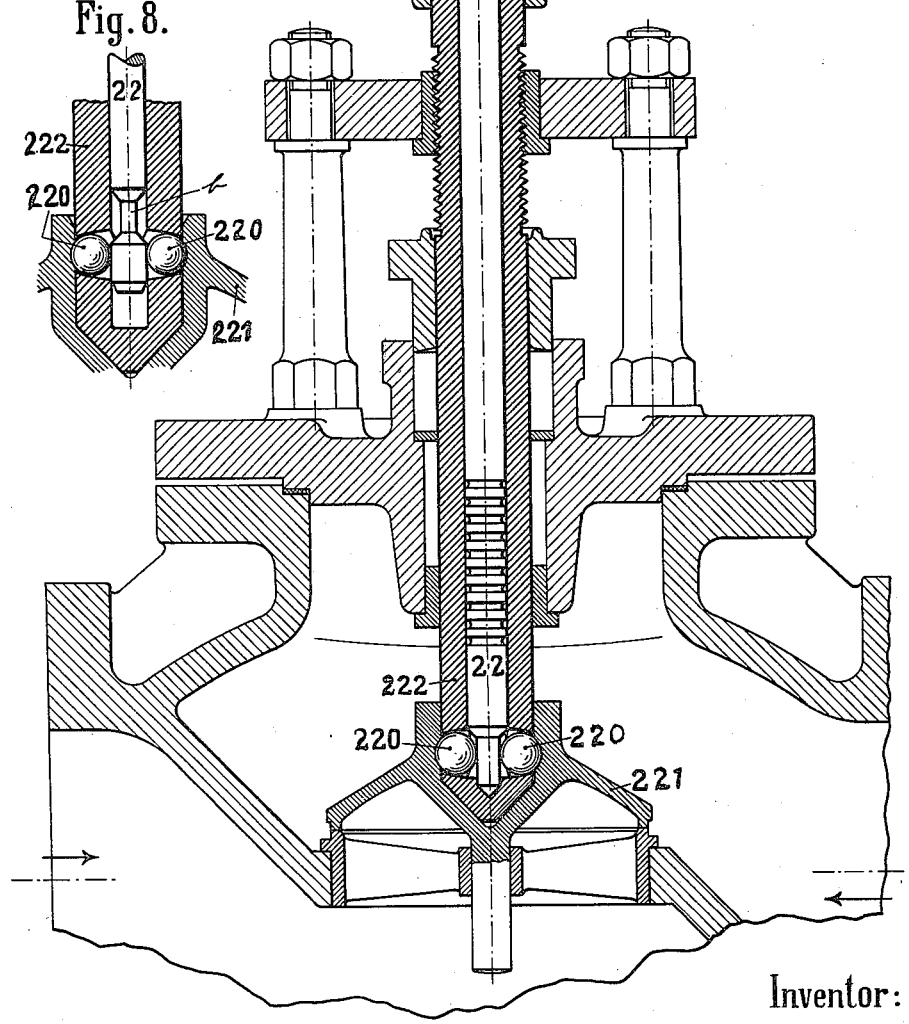
Fig. 7 is a longitudinal section through a boiler valve in the closed position.
Fig. 8 is a modification of the valve shown in Fig. 7.

In the specific construction illustrated in Fig. 7 there is shown a valve member 221 provided with a socket or recess encircled by an annular wall into which the valve stem or spindle 222 projects. The latter is hollow and has mounted within it a longitudinal movable rod 22 constituting the cam member. The inner surface of the peripheral wall of the recess in the valve member is provided with an annular groove and the wall of the hollow spindle has radial passages in which are mounted balls 220, adapted to enter said groove. The diameter of each ball is somewhat greater than the thickness of the wall of the spindle so that the balls may project from either or both surfaces of the spindle wall. The rod 22 at its lower end has an annular groove or is reduced in diameter to such an extent that this reduced portion may pass the balls when the latter are in engagement with the valve member, and the parts may be held rigid in respect to each other as shown in Fig. 7. The rod 22 may have packing rings or other means for preventing the escape of fluid along its outer surface. The outer ends of the radial passages of the valve stem wall are preferably slightly smaller than the diameter of the balls so that when the valve is entirely free of the valve stem the balls cannot fall out.

With the rod and valve stem in the relative positions shown in Fig. 7, the main valve may be positively opened or closed by the endwise movement of the hollow valve stem. This valve stem may have threaded engagement with the valve casing and may be provided with a hand wheel 24 of comparatively large diameter for effecting the rotation of the valve stem and the opening and closing of the valve. If conditions require the valve to be closed instantly, when open, as for instance when a steam pipe breaks, it is not necessary to rotate the valve stem to bring the valve back to its seat, but the valve may be released from the stem and permitted to drop instantly to its seat by lifting the rod 22. A simple means for effecting such action may be a lever 25 with jaws $a$ and $a^1$ spaced apart and engaging with opposite sides of a head member $d$ on the rod 22. Upon moving the outer end of the lever 25 downwardly the rod 22 is raised and the balls may move inwardly to release the valve and permit it to drop to its seat. When it is desired to reopen the valve it is merely necessary to screw the valve stem downwardly until it seats in the valve and thereafter move the rod 22 downwardly to force the balls out into locking position.

In the construction shown in Fig. 7 it will be noted that a raising of the rod 22 is necessary for releasing the balls. In Fig. 8 I have shown a simple modication in which the lowering of the rod releases them. The construction is very similar to that shown in Fig. 7 except that the rod has an annular groove $b$ into which the balls may move upon the lowering of the rod. Below this groove is a portion of full diameter normally preventing the inward radial movement of the balls.

Figure 9:
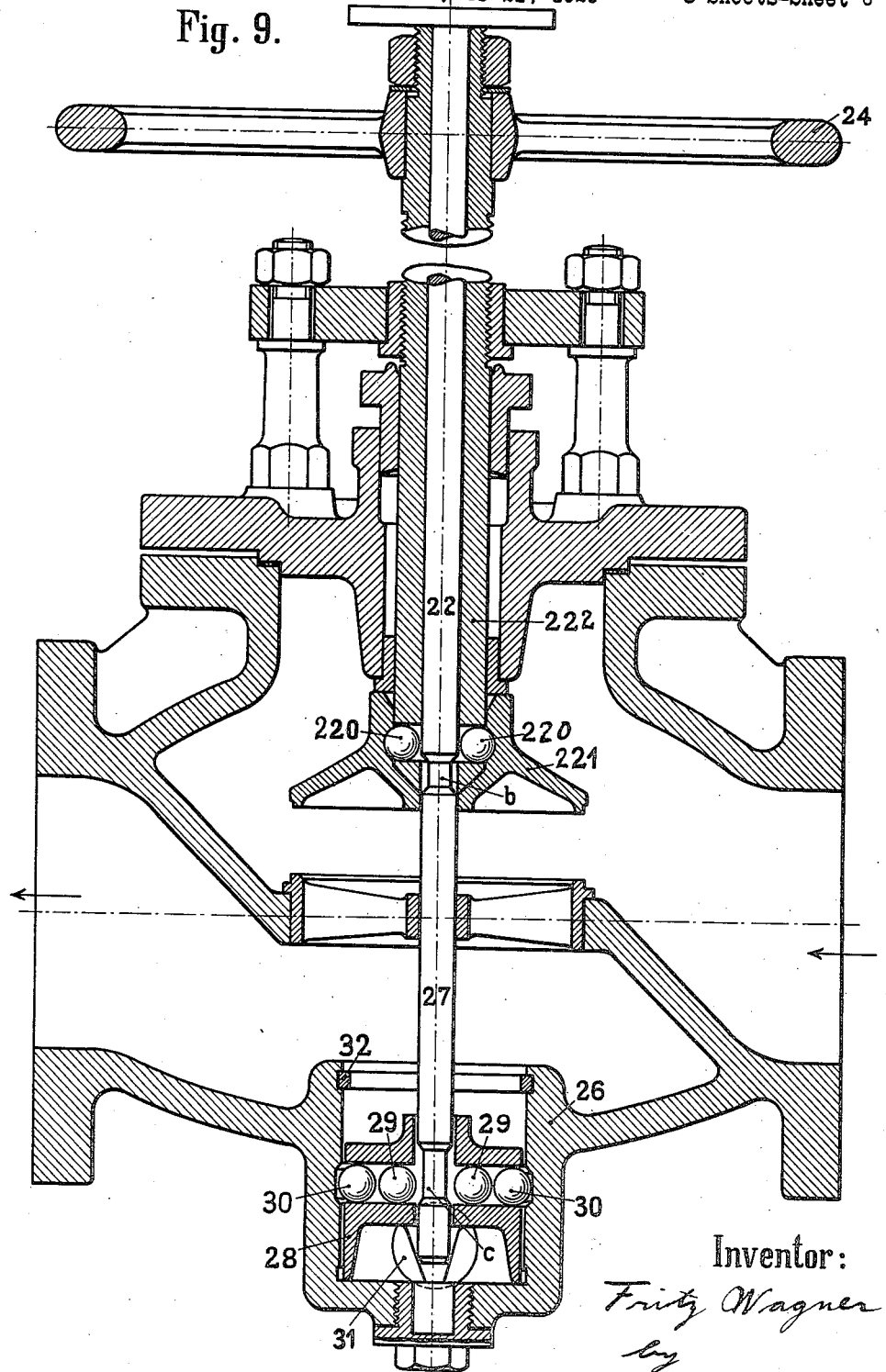
Fig. 9 is a longitudinal section through a valve adapted to close automatically in the case of a breakage of the pressure pipe, the valve being shown in its open position.

In the construction shown in Figs. 7 and 8 the ball releasing rod may be operated either automatically or manually. In some cases it is desirable to automatically release the main valve so as to permit it to close in case of breakage of the pressure pipes. To accomplish this result I may employ the construction shown in Figs. 9 and 10. The endwise movable cam bar 22 is provided with an extension part 27 projecting through a piston 28 mounted in a cylinder 26 on the discharge side of the valve. The cylinder has a stop at its upper end to limit the movement of the piston, this being preferably in the form of a ring 32. The inner surface of the cylinder is provided with a cam groove and the external surface of the member 27 has a similar cam groove $c$. The piston carries radially movable balls or locking members, the inner ones 29 being movable into or out of the groove $c$ of the member 27 and the outer ones 30 movable into or out of the groove of the cylinder. The portion of the cylinder below the piston communicates through an opening 31 with a small reservoir for fluid under pressure. In normal operation the pressure at both sides of the piston is the same when the main valve 221 is open. The valve may thus be manually operated by the main valve spindle 222 and hand wheel 24 and the member 27 may freely pass through the piston 28. In case breakage occurs the pressure on the upper side of the piston instantly decreases while the excess pressure on the lower surface of the piston forces the latter upwardly against the ring 32. During this upward movement the balls are forced inwardly from the groove of the cylinder into the groove of the bar 27 and further upward movement of the piston moves the bar up and re-releases the balls 220 so that the main valve may move instantly to its seat. In Fig. 9 I have shown the parts with the valve in normal open position, and in Fig. 10 have shown them in normal closed position.

Some of the main features of the construction above described may be combined in a single valve, as shown in Fig. 11. This valve is so designed that it may be opened or closed from a distance as for instance by use of a wire rope. The operating mechanism includes a lever 35 connected by links 34 to a cross-head 37 fixed to the spindle $222^x$. The bar $22^x$ is connected to the bolt 36 without lost motion, although the bolt itself has lost motion or free play in the cross head 37. The lever 35 has opposite arms 38 and 39 which may be connected to operate by wire ropes if desired. By pulling on the lever 38 the bolt 36 will first be raised to raise the rod $22^x$, and when the free play of the bolt 36 in the cross-head has been taken up the further movement of the lever 35 will cause the lifting of the cross-head and the bodily lifting of the main valve stem or spindle $222^x$. The main valve may be constructed substantially identical with that shown in Fig. 3, and therefore detailed description of it is not necessary. The spindle is shown as being provided with a head 40 carrying balls 42 serving to couple or uncouple the valve stem enlargement $11^x$. The auxiliary valve $2^x$ may be coupled to or freed from this valve stem enlargement $11^x$. Upon the swinging of the lever 35 and the raising of the bolt 36 the first action will be for the enlargement on the rod $22^x$ to force the balls 42 and $23^x$ outwardly to lock the auxiliary valve, the valve stem enlargement and the valve stem rigid in respect to each other. Further upward movement of the bolt 36 raises the cross-head 37 and the valve stem until the valve stem enlargement $11^x$ engages the abutment $12^x$ of the main valve. Thereafter the main valve opens, as in the form shown in Fig. 3 and the main valve is locked against chattering and against any relative movement in respect to the valve stem. When it is desired to close the main valve suddenly the lever 35 is moved in the opposite direction until the bolt 36 reaches the lower end of its free play in the cross-head 37. This moves the rod $22^x$ downwardly and releases the balls $23^x$ so that the auxiliary valve may drop to its seat in the main valve. The enlargement $11^x$ is also freed from the valve stem, and the main valve is permitted to close instantly. With the main valve in closed position the valve stem and rod are lowered to their limiting position and are automatically re-locked to the auxiliary valve and valve stem enlargement or cam device $11^x$. Various other constructions and arrangements may be effected within the scope of my invention as defined in the following claims. Many of the details illustrated are not important, as for instance, I have shown the balls operating horizontally, assuming the valve stem to be vertical, but the balls may operate along inclined paths if desired.

Having thus described my invention, what I claim as new and desire to secure by Letters Patent is:

1. A valve for controlling fluids under pressure, including a valve member, a valve stem, and a connecting member for the valve member and valve stem operated from within the valve casing, and movable radially in respect to the stem.

2. In combination, a valve member, a valve stem member, a cam member and a coupling for connecting said valve and stem and operating upon a relative movement of the cam member and one of the other of said members.

3. In combination, a valve member, a valve stem member, one of said members having a radial passage, a coupling in said passage adapted to project from one end or the other thereof to lock or free the valve in respect to the stem, and a cam for engaging with one end of the coupling to cause or permit movement of said coupling into or out of locking position.

4. In combination, a valve member, a valve stem member, one of said members having a plurality of radially movable balls adapted to engage with the other member to lock said valve and stem against relative axial movement, and a cam for engaging with said balls to cause or permit movement thereof into or out of locking position.

5. In combination, a valve member, a valve stem member, one of said members having a plurality of radially movable balls adapted to engage with the other member to lock said valve and stem against relative axial movement, and a cam for engaging with said balls to cause or permit movement thereof into or out of locking position, said cam and the member carrying said balls being relatively movable axially.

6. In combination a valve member, a valve stem member, one of said members having radial passages, coupling elements mounted in said passages and a cam for forcing or permitting movement of said coupling elements into or out of locking engagement with the other member.

7. In combination a valve member, a valve stem member, one of said members having radial passages, coupling elements mounted in said passages, and a stationary cam for forcing said coupling devices into locking engagement with the other member upon a predetermined axial movement of said members in respect to said cam.

8. In combination a valve member having a radial passage, a valve stem having lost motion connection to said valve, a coupling device mounted in said passage, and a stationary cam for forcing said coupling device into engagement with said stem to prevent said lost motion upon a predetermined axial movement of said stem and of said valve.

9. In combination a valve casing having an annular groove, a valve member having radial passages, coupling devices in said passages adapted to enter said groove when said valve is in closed position, and a valve stem having lost motion connection to said valve when the latter is in closed position and locked to said valve by said coupling devices upon the opening movement of the valve and the radial movement of said coupling devices.

10. In combination a valve casing having an annular cam groove, a valve member having radial passages and an abutment above the latter, a valve stem having an annular flange movable into and out of position opposite to said passages, and out of and into engagement with said abutment, and coupling members in said radial passages, the wall of said cam groove serving to force said coupling members inwardly beneath said flange to lock the latter against said abutment upon the movement of said valve away from its seat.

11. In combination a valve casing, a valve member, a valve stem having limited longitudinal movement in respect to said valve when the latter is seated, and means for preventing said movement when said valve is in open position.

12. In combination a valve casing, a valve member, a valve stem having limited longitudinal movement, in respect to said valve when the latter is seated, and means for preventing said movement when said valve is in open position, said means including a radially movable coupling device carried by said valve, said valve casing having a part acting to hold the coupling device in operative position when the valve is open and permitting it to move to inoperative position when the valve is closed.

13. In combination, a valve casing presenting a cam surface, a valve member, a valve stem having limited longitudinal movement in respect to the valve when the valve is in closed position, and coupling devices carried by said valve and forced into locking engagement with said valve stem by the action of said cam surface upon an opening movement of said valve.

14. In combination, a main valve having a passage therethrough, an auxiliary valve for controlling said passage, a valve stem for operating said auxiliary valve and having lost motion connection to said main valve and means for preventing said lost motion when the main valve is in open position.

15. In combination, a main valve having a passage therethrough, an auxiliary valve for controlling said passage, a valve stem for operating said auxiliary valve and having lost motion connection to said main valve and means for preventing said lost motion when said auxiliary valve and said main valve are both in open position.

16. In combination, a main valve having a passage therethrough, an auxiliary valve for controlling said passage, a valve stem for operating said auxiliary valve and having lost motion connection to said main valve, and a coupling device carried by said main valve and movable into locking engagement with said stem upon the opening movement of the main valve.

17. In combination, a valve casing, a main valve having a passage therethrough, an auxiliary valve for controlling said passage, a valve stem for operating said auxiliary valve and having lost motion connection to said main valve, and a coupling device carried by said main valve, said casing having a part acting to force said coupling device radially and prevent said lost motion upon the movement of the main valve to open position.

18. In combination, a main valve member having a passage therethrough, a radial passage and an abutment above the latter, an auxiliary valve for said first mentioned passage, a valve stem connected to said auxiliary valve and having a flange below said abutment and adapted to engage with the latter to open the main valve after the opening of the auxiliary valve, a locking member in said radial passage, and means for forcing said locking member into engagement with said stem after said auxiliary valve has been opened and said flange has engaged with said abutment to begin the opening movement of the main valve.

19. In combination, a valve casing having a cam groove, a main valve member having a passage therethrough, radial passages, and an abutment above the latter, an auxiliary valve for said first mentioned passage, a valve stem for operating said auxiliary valve and having a flange below said abutment and spaced therefrom when said valves are in closed positions, and balls mounted in said radial passages and projecting into said cam groove when the main valve is in closed position, and permitting relative longitudinal movement of the stem and main valve, the wall of said cam groove forcing said balls into locking engagement with said valve stem upon the opening of the main valve after the opening of the auxiliary valve.

20. In combination, a valve casing having a pair of concentric spaced walls, a main valve having spaced portions guided by said walls and a central passage communicating with the space between said guided portions and with the space encircled by the inner portion, an auxiliary valve for controlling the outlet from said passage a valve stem connected to said auxiliary valve and having lost motion connection with the inner guided portion, and a coupling member carried by said inner guided portion and adapted to be forced into locking engagement with said valve stem by the action of the inner of said casing walls.

21. In combination, a valve casing having a pressure chamber, a main valve having a piston portion with a passage therethrough, an auxiliary valve for controlling the outlet from said pressure chamber through said passage, a valve stem connected to said auxiliary valve and having an inwardly and downwardly inclined cam surface, said casing having an upwardly and inwardly inclined cam surface and said main valve having a radial passage separate from said piston portion and a locking member in said radial passage for locking the main valve to the valve stem and adapted to engage with said casing cam surface to free said valve stem from the main valve when the main valve is in closed position and engaging with said valve stem cam surface to lock said valve stem to said main valve when the main valve is in open position.

22. In combination, a valve casing part having a pressure chamber, a second valve casing part presenting a valve seat, a main valve having a piston portion operating in said pressure chamber and having a passage therethrough, an auxiliary valve for controlling the outlet from said pressure chamber through said passage, a valve stem connected to said auxiliary valve and having lost motion connection to said main valve in the closed position of the main valve and means for preventing said lost motion when said main valve is in open position.

23. In combination, a valve casing member, a valve member, a valve stem member, a coupling part for locking two of said members together and a cam rigid with the third member for forcing the coupling part to operative position upon a predetermined relative movement of the member carrying said cam and one of said members.

24. In combination a valve casing member, a valve member, a valve stem member, a coupling part carried by one of said members for locking said member to one of the other members, and a cam rigid with the third member for operating the coupling part upon a relative movement of the member carrying said cam and the member carrying said coupling part.

25. In combination a valve member, a valve stem, a valve casing, said stem and said casing presenting cam surfaces, and a coupling member carried by the valve and operated by engagement with said surfaces upon relative movement of the stem and valve and of the valve and casing to couple said valve and one of said other parts together.

26. In combination a valve member, a valve stem, a valve casing, a coupling member carried by the valve, and means for forcing it into locking engagement with the casing upon a predetermined movement in one direction of the stem in respect to the valve.

27. In combination a valve member, a valve stem, a valve casing, a coupling member carried by the valve and means for forcing it into locking engagement with the stem upon a predetermined relative movement of the valve in respect to the casing.

28. In combination a valve member, a stem, locking connections between the valve member and the stem, and means for operating said connections to lock them together when the stem is in one part of its range of movement, and to permit limited relative movement of the valve lengthwise of the stem when the stem is in another part of its range of movement.

29. In combination, a valve member, a valve stem having lost motion connection therewith when the valve is in closed position, and means for locking the valve and stem together to prevent relative longitudinal movement when the stem is moved beyond the limit of said lost motion and the valve is moved to open position.

Signed at Berlin in the country of Germany this 21 day of January 1921.

FRITZ WAGNER.